United States Patent [19]
Chen et al.
[11] 3,842,414
[45] Oct. 15, 1974

[54] BINARY CODED DECIMAL CONVERSION APPARATUS

[75] Inventors: Tien Chi Chen, San Jose, Calif.; Irving Tze Ho, Poughkeepsie, N.Y.
[73] Assignee: International Business Machines Corporation, Armonk, N.Y.

[22] Filed: June 18, 1973
[21] Appl. No.: 371,004

[52] U.S. Cl.......... 340/347 DD, 235/155, 340/172.5
[51] Int. Cl........................... H03k 13/24, H04l 3/00
[58] Field of Search.................. 340/347 DD, 172.5; 235/155

[56] References Cited
UNITED STATES PATENTS 3,432,811 3/1969 Rinaldi et al. .................... 340/172.5
3,618,047 11/1971 Hertz ............................... 340/172.5

*Primary Examiner*—Malcolm A. Morrison
*Assistant Examiner*—Vincent J. Sunderdick
*Attorney, Agent, or Firm*—William J. Dick

[57] ABSTRACT

Apparatus for encoding multi-digit binary-coded-decimal numbers of a predetermined quantity of bits, for example, of at least two decimal digits, into a re-expressed lower number of bits, the binary-coded-decimal number being expressed in the form (*abcd*) (*efgh*). An encoder selects a set from a class of sets of bit symbols with each set corresponding to a respective combination of the bits in the most significant position, (*a*) and (*e*), of each of the four-bit groups representing the respective digits of the binary-coded-decimal number to be encoded. The selected set is the set which corresponds to the respective combination and the encoder determines certain of the bits of the multi-digit binary-coded-decimal number to be encoded and leaves undetermined the remaining bits of the number. The encoder is connected to register means having a plurality of bit positions which are equal to the quantity of bits less than the predetermined quantity, and stores not only the determined bit symbols but also the undetermined other bits of the multi-digit binary-coded-decimal number.

14 Claims, 12 Drawing Figures

| | RE-EXPRESSED FORM 7 BIT ENCODER OUTPUT | | | | | | | BINARY-CODED DECIMAL | | | | | | | |
|---|---|---|---|---|---|---|---|---|---|---|---|---|---|---|---|
| WHEN | U | V | W | d | X | Y | h | a | b | c | d | e | f | g | h |
| e=0, a=0 | 0 | b | c | d | f | g | h | 0 | b | c | d | 0 | f | g | h |
| e=0, a=1 | 1 | 0 | c | d | f | g | h | 1 | 0 | 0 | d | 0 | f | g | h |
| e=1, a=1 | 1 | 1 | 0 | d | f | g | h | 1 | 0 | 0 | d | 1 | 0 | 0 | h |
| e=1, a=0 | 1 | 1 | 1 | d | b | c | h | 0 | b | c | d | 1 | 0 | 0 | h |

CONVERSION: BINARY CODED DECIMAL NUMBERS TO RE-EXPRESSED FORM, (TWO DIGIT NUMBER)

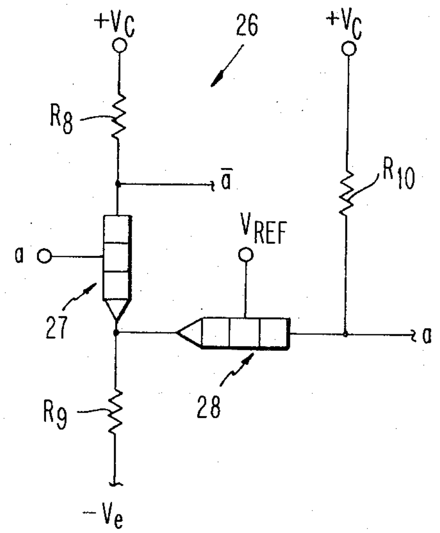

FIG. 5

| | e=0 a=0 | e=0 a=1 | e=1 a=1 | e=1 a=0 |
|---|---|---|---|---|
| U | 0 | 1 | 1 | 1 |
| V | (X) | 0 | 1 | 1 |
| W | (X) | (X) | 0 | 1 |
| X | (X) | (X) | (X) | (X) |
| Y | (X) | (X) | (X) | (X) |
| a | 0 | 1 | 1 | 0 |
| b | V | 0 | 0 | X |
| c | W | 0 | 0 | Y |
| e | 0 | 0 | 1 | 1 |
| f | X | X | 0 | 0 |
| g | Y | Y | 0 | 0 |

CONVERSION FROM RE-EXPRESSION FORM TO BINARY-CODED-DECIMAL NUMBERS

FIG. 6

| WHEN | | | RE-EXPRESSED FORM 10 BIT ENCODER OUTPUT | | | | | | | | | | BINARY CODED DECIMAL (BCD) |
|---|---|---|---|---|---|---|---|---|---|---|---|---|---|
| a | e | i | U | V | W | X | Y | Z | Q | d | h | l | (abcd) (efgh) (ijkl) |
| 0 | 0 | 0 | 0 | b | c | f | g | j | k | d | h | l | 0bcd, 0fgh, 0jkl |
| 1 | 0 | 0 | 1 | 0 | 0 | f | g | j | k | " | " | " | 100d, 0fgh, 0jkl |
| 0 | 1 | 0 | 1 | 0 | 1 | b | c | j | k | " | " | " | 0bcd, 100h, 0jkl |
| 0 | 0 | 1 | 1 | 1 | 0 | f | g | b | c | " | " | " | 0bcd, 0fgh, 100l |
| 1 | 1 | 0 | 1 | 1 | 1 | 0 | 0 | j | k | " | " | " | 100d, 100h, 0jkl |
| 1 | 0 | 1 | 1 | 1 | 1 | 0 | 1 | f | g | " | " | " | 100d, 0fgh, 100l |
| 0 | 1 | 1 | 1 | 1 | 1 | 1 | 0 | b | c | " | " | " | 0bcd, 100h, 100l |
| 1 | 1 | 1 | 1 | 1 | 1 | 1 | 1 | 0 | 0 | " | " | " | 100d, 100h, 100l |

CONVERSION: BINARY-CODED DECIMAL NUMBERS TO RE-EXPRESSED FORM, (THREE DIGIT NUMBER)

FIG. 9

BINARY CODED DECIMAL CONVERSION APPARATUS

SUMMARY OF THE INVENTION AND STATE OF THE PRIOR ART

The present invention relates to non-arithmetic number compression, and more specifically relates to apparatus for compressing binary-coded-decimal numbers of at least two decimal digits into a re-expressed lower number of bit symbols. In the preferred embodiment of the invention, array logic is used for such compression.

The computer user, in most instances, will prefer to use decimal arithmetic over binary arithmetic. However, conventional hardware systems of decimal logic circuits and decimal memory cells cannot compare to the logic and memory circuits employed in binary systems, especially with regard to simplicity and noise tolerance. It has generally been agreed that a binary-coded-decimal system is a reasonable compromise between the decimal arithmetic and binary arithmetic advocates. However, using four binary bits to represent a decimal digit is quite inefficient. In binary form, four binary bits (abcd) can store up to 16 states (0–15). In coding a decimal number, however, in the form (abcd), four binary bits can only store 10 states (0–9). The loss of information storage capability for the coding of a decimal number, therefore, of just one decimal digit is 60 percent and therefore substantial. If one considers that the loss is even greater, as shown in the table below, when more decimal digits are stored, it is easy to recognize why binary-coded-decimal systems are not favored over binary systems, i.e., because of the severe loss of information storage capability.

| Decimal Digits | Binary Bits Required | Loss of Information Storage Capability |
|---|---|---|
| 1 | 4 | $(2^4/10 - 1)= 60\%$ |
| 2 | 8 | $(2^8/100 - 1)=156\%$ |
| 3 | 12 | $(2^{12}/1000 - 1)=310\%$ |

Conventionally, binary-coded-decimal numbers may be compressed or encoded into true binary form through multiplication and/or addition. The digit at the "10 position" (*abcd*) is multiplied by 10 and then added to the digit at the "1 position" (efgh). An example of a number in the form (*abcd*) (*efgh*) is the number 73 in binary-coded-decimal, which will be (0111) (0011). The compression of such a number into its true binary form may be time consuming because it requires both multiplication and addition and the binary form of the number 73, i.e., (01001001) is difficult for a human to read. Of course, from the binary form, the number can be reverse coded into binary coded decimal form through dividing the binary number by 10 where the number is less than digital 99. The quotient of such a division is the digit at the 10 position and the residue is the digit at the 1 position. This process, i.e., reverse coding, may even be more time consuming and space wasteful.

In view of the above, it is a principal object of the present invention to provide apparatus for encoding multidigit binary-coded-decimal numbers, each of a predetermined first quantity of bits, into encoded numbers each having a second quantity of bits less than the predetermined quantity.

Another object of the present invention is to provide a high speed array logic implementation of binary-coded-decimal number re-expressions utilizing less bits or fewer bits in the encoded numbers than in the original binary coded decimal number.

Another object of the present invention is to provide apparatus for compressing binary coded decimal numbers of at least two decimal digits into a re-expressed lower number of bits so that the loss of information storage capability, versus the binary number storage capability will be, when utilizing two decimal digits, only 28 percent, and when utilizing the re-expressed form with three decimal digits a loss of only 2.4 percent will be encountered.

Another object of the present invention is to provide an encoding scheme wherein in the two decimal digit binary-coded-decimal conversion, the encoded or re-expressed number will be parity invariant with the binary-coded-decimal number, which is not possible in the binary-coded-decimal to true binary conversion methods heretofore known.

Another object of the present invention is to provide apparatus for encoding multi-digit binary-coded-decimal number into a re-expressed lower number of bit forms in which the converted or re-expressed bit pattern preserves, to a large extent, bit pattern readability, while permitting the bit pattern sequence in the re-expressed form to be altered, if such is desired.

Other objects and a more complete understanding of the invention may be had by referring to the following specification and claims taken in conjunction with the accompanying drawings in which:

FIG. 5 is a schematic diagram illustrating the phase splitters shown in block form in the schematic diagram of FIG. 4A;

FIG. 6 is a table illustrating the conversion from the re-expressed form to binary-coded-decimal numbers;

FIG. 9 is a table illustrating, for a three digit binary-coded-decimal number the conversion of such a number from the binary-coded-decimal to its re-expressed form;

Figures 1, 2:
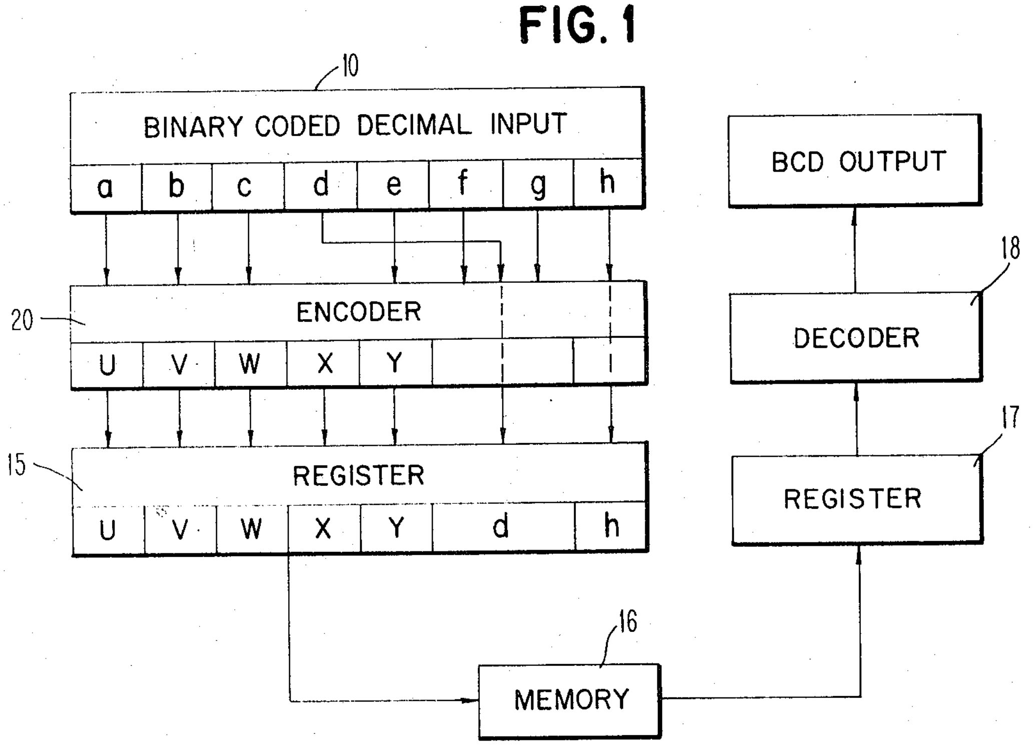
FIG. 1 is a schematic block diagram illustrating a typical organization for utilizing the apparatus of the present invention.
FIG. 2 is a table illustrating the conversion of a two digit, binary coded decimal number to its re-expressed form.

Referring now to the drawings, and more specifically FIG. 1 thereof, a binary-coded-decimal input means 10, which may comprise a register or a memory or other input means, is shown connected to an encoder 20 which operates to encode multi-digit binary-coded-decimal numbers, each of a predetermined first quantity of bits, in the illustrated instance the bits being expressed in the form *abcd*, *efgh*, into encoded numbers (re-expressed form) each having a second quantity of bits less than the predetermined quantity, in the illustrated instance comprising bit symbols UVWXYdh. The output of the encoding means or encoder 20 may communicate directly with, for example, a register 15 which communicates directly with, for example, a memory 16. The memory 16 may operate, for example, in conjunction with a central processing unit (CPU), and may be a disk file, tape or other memory structure. To decode the second quantity of bits (re-expressed form) into a multi-digit binary-coded-decimal number, corresponding to the binary-coded-decimal number placed into the input 10, the memory 16 may be connected to a second output register 17, and a decoder 18. It should be recognized that the significant feature of the invention is the compression of the binary-coded-decimal number into a predetermined second quantity of bits less than the predetermined or first quantity in the multi-digit binary-coded-decimal number.

In accordance with the invention, the encoder means 20 selects a set from a class of sets of bit symbols with each set corresponding to a respective combination of the bits in the most significant position of each of the four-bit groups *abcd*, *efgh* representing the respective digits of the binary-coded-decimal number to be encoded, the selected set being the set corresponding to the respective combination of the most significant digit and the encoder then determining certain of the bits of the multi-digit binary-coded-decimal number to be encoded and leaving undetermined the remaining bits of the number to be encoded.

THE SCHEME

As heretofore set forth, the use of four binary bits to represent a decimal digit is inefficient. In binary form, the four binary bits may store sixteen states (0–15), while coding a decimal number, i.e., binary-coded-decimal numbers, only 10 states may be stored (0–9). The loss of information storage capability as illustrated in Table 1 in the section hereof labelled "Summary of the Invention and State of the Prior Art", is 60 percent for a single digit number, 156 percent with two decimal digits and 310 percent with three decimal digits. By the compression scheme hereinafter described, it is possible to re-express two decimal digits into seven binary bits, and three decimal digits in ten binary bits or bit symbols. The loss of information storage capability, therefore, after re-expression is greatly reduced and in the order of 28 percent (as compared with binary storage capability) with two decimal digit numbers, and only 2.4 percent with three decimal digit numbers.

Discussing first the two binary digit number, and in the binary-coded-decimal form of *abcd*, *efgh*, the following table illustrates the binary-coded-decimal number versus the decimal number for each decimal digit from 0 through 9:

| Value | Binary Coded Decimal Number |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |

An examination of the above table shows that the binary bit 1 only occurs in the most significant position of the binary-coded-decimal number when the corresponding decimal number is 8 or 9. Thus, considering for example a two digit binary-coded-decimal number of the form *abcd*, *efgh*, 80 percent of the time the bit *a* will equal 0 and the bit *e* will equal 0. Thus in a two digit, binary-coded-decimal number, 64 percent of the time *a* and *e* will equal 0, (i.e. 80 × 80 percent). Referring now to FIG. 2, by designating the re-expressed bits UVWdXYh, when *e* is equal to 0 and *a* is equal to 0 the re-expressed bit *u* is designated as 0, and the re-expressed bit V is the same as the bit *b*, the re-expressed bit W is the same as the bit *c*, the *d*, and *h* bits are identical, (as will be discussed more fully hereinafter) and may be carried through in the same form, while re-expressed bits X and Y correspond to the bits of the binary-coded-decimal number *f* and *g*. For ease of reading, the righthand column designated "Binary-Coded-Decimal" (BCD) is set forth in that format for ease of correspondence between the re-expressed and the original binary-coded-decimal number. It should be recognized, of course, that if *e* and *a* are each 0 80 percent of the time then on the occurrence of the occasion when *a* is equal to 1, *e* is equal to 0, or vice versa, the occurrence of these conditions is only 20 × 80 percent or 16 percent of the time. Additionally, when *e* is equal to 1 and *a* is equal to 1, this occurs only 20 × 20 percent or 4 percent of the time. Accordingly, the set when *e* equals 0 and *a* equals 0 is the bit 0; when *e* equals 0, *a* equals 1 the set equals 10 when *e* equals 1 and *a* equals 1 the set comprises the bits 110, and; when *a* equals 0 *e* equals 1, the set is 111. As shown above, each set of the class of sets comprises the condition expected for various conditions of the most significant bit position of each of the four bit groups (i.e., bit *a* and bit *e*) of the binary-coded-decimal number.

Taking an example by utilizing the table of FIG. 2, the number 73 in binary-coded-decimal is 01110011. Inasmuch as both the *a* and the *e* bits are 0, in re-expressed form, i.e., the 7 bit encoder output is: 0111011. By way of comparison, in straight binary, the encoding is 1001001.

Figure 3:
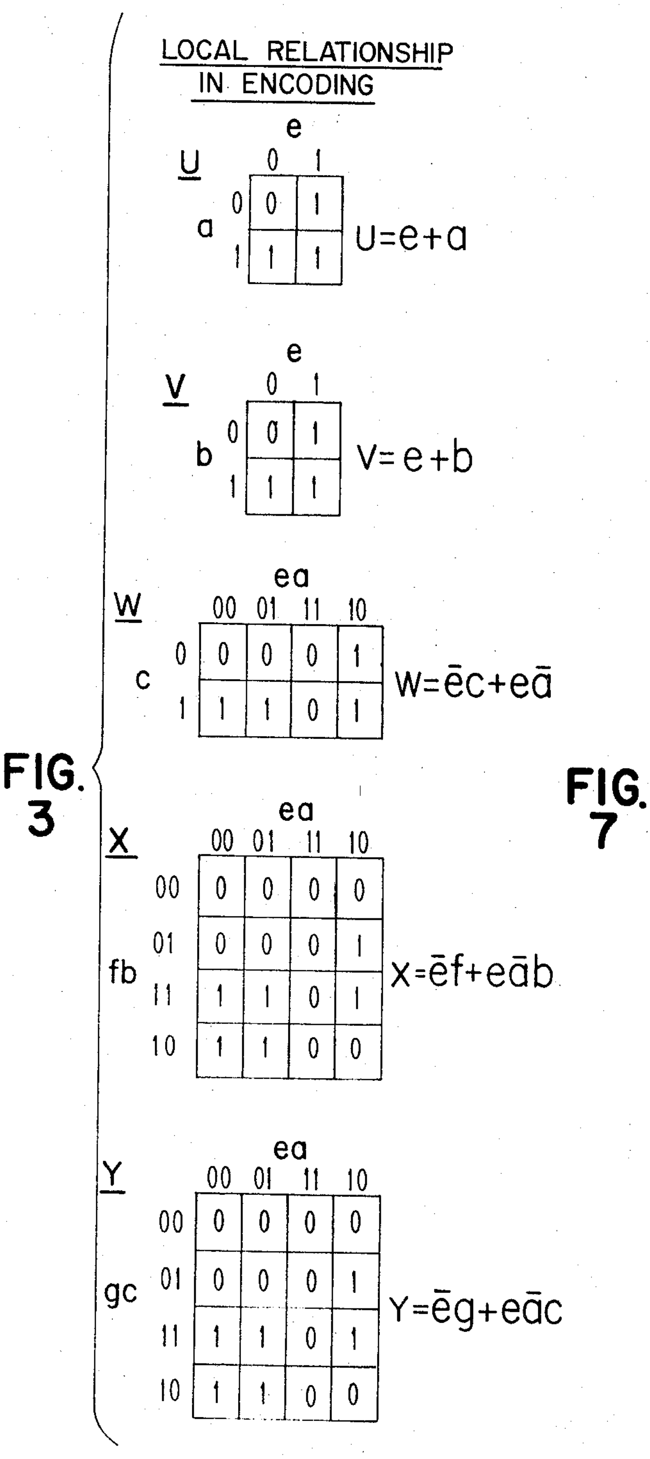
FIG. 3 is a plurality of truth tables illustrating the logical relationship in encoding for re-expressing binary-coded-decimal number inputs to their re-expressed form.

The logical relationship in encoding is illustrated in FIG. 3, with appropriate truth tables and logical relationship formulae. For example, the logical relationship to determine the encoder output in re-expressed form to determine the bit symbol U, is to OR *e* and *a;* to determine the bit symbol representative of V, is to OR *e* and *b;* to determine the bit symbol for W, $\bar{e}$ ANDed with $c$ and OR'd with $e$ ANDed with $\bar{a}$; for X, $\bar{e}$ is ANDed with $f$ and OR'd with $e$ ANDed with $\bar{a}$ ANDed with $b$; Y is determined by $\bar{e}$ ANDed with $g$ and OR'd with $e$ ANDed with $\bar{a}$ ANDed with $c$. To conserve array space, which will be more fully explained hereinafter, the bit symbols $d$ and $h$ are left undetermined and, since they are the least significant bits of a four bit group in a two digit binary-coded-decimal number, are fed directly through so that the $d$ and $h$ of the binary-coded-decimal number are the same as the $d$ and $h$ in the re-expressed form.

ENCODING

Figure 4A:
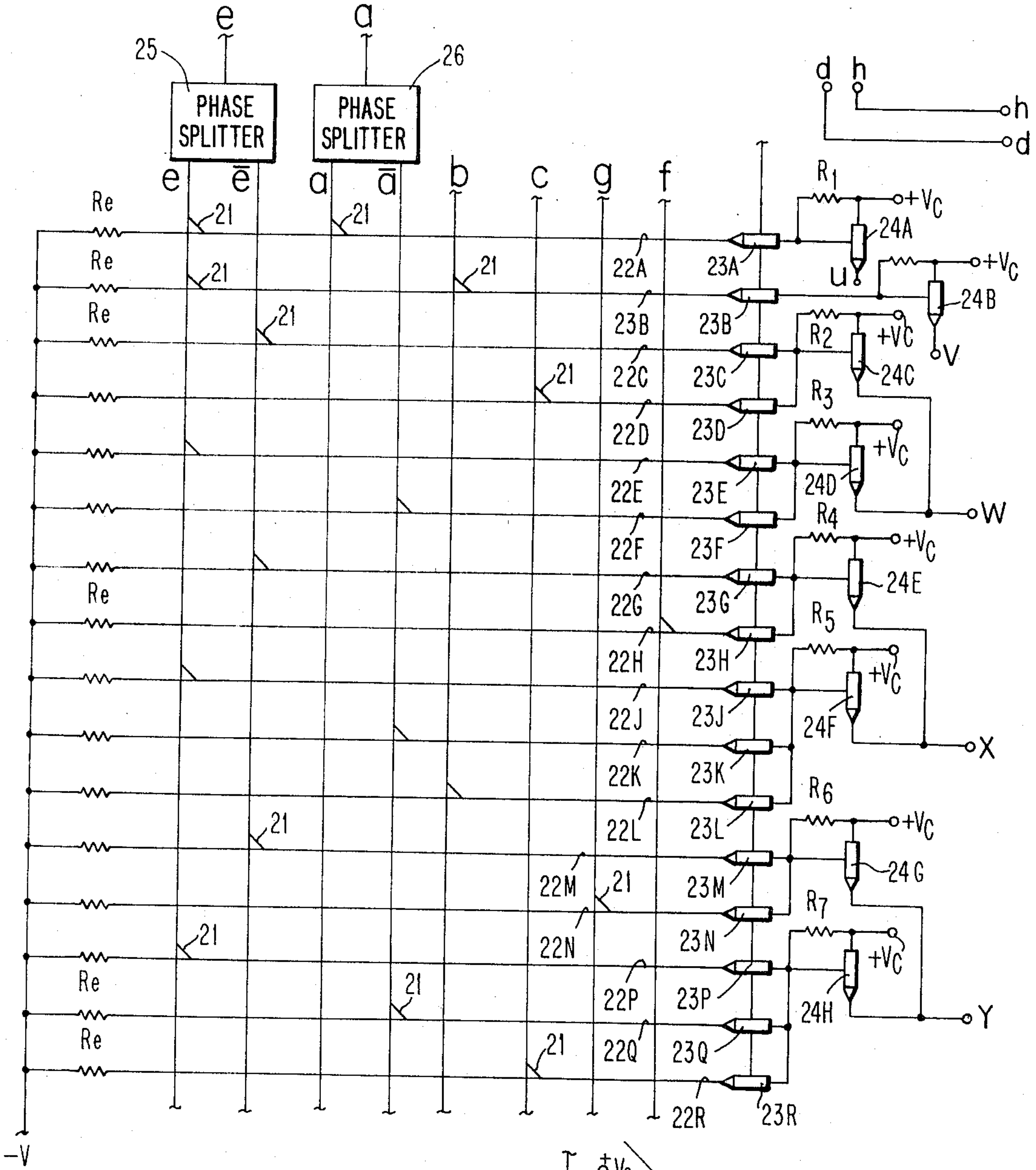
FIG. 4A is a one example of an encoding array which may be utilized to re-express binary-coded-decimal numbers into an encoded, second quantity of bits less than the first quantity placed into the encoder representing the binary-coded-decimal number.
Figure 4B:
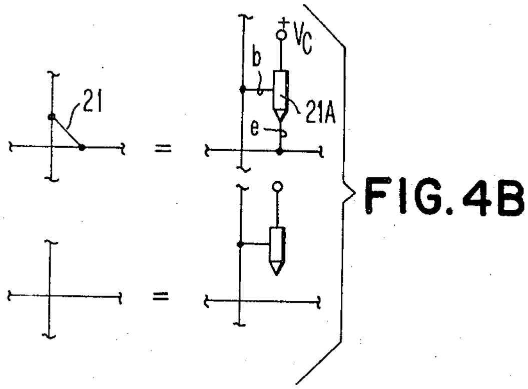
FIG. 4B is a legend illustrating the wiring counterparts of certain elements illustrated in FIG. 4A.

In FIG. 4A is shown an encoder 20 which may be utilized to select a set from a class of sets, as heretofore defined, each set corresponding to a respective combination of the bits in the most significant position $a$ and $e$, of each of the four bit groups representing the respective digits of the binary-coded-decimal number to be encoded. The encoder 20 converts the conventional binary-coded-decimal numbers expressed in the form *abcd, efgh* into a seven bit output expressed in the form UVWXYdh. To this end and referring now to FIG. 4A, an array logic encoder is illustrated therein, the logic being preferably of the form of a "read only associative memory". In this form, which is preferable, only two stages of logic circuit delay are required for either encoding or decoding. The logic delays which are illustrated in FIGS. 4A, 4B and FIG. 5 are those of the current switch, emitter follower circuits, but may just as easily or conveniently be formed of the familiar TTL circuits or appropriate MOSFET circuits. As shown, the encoder 20 comprises a matrix of vertically oriented bit lines which are coupled at appropriate places as at 21 to horizontally oriented word lines designated 22A–22R inclusive. (The symbols 1 and 0 have not been used to avoid confusion.) As illustrated, each of the word lines 22 includes a resistor Re which is connected to a voltage supply source, in the present instance $-V_E$. Each of the interconnections 21 between the word lines 22 and the bit lines includes a transistor (see FIG. 4B) 21A connected as an emitter follower, the base of the transistor 21A being connected to a bit line, and the emitter of the transistor being connected to a word line 22. Of course the collector of the transistor is connected to a source of voltage, in the illustrated instances inasmuch as the transistors shown are of the NPN type, the collector is connected to a source of positive power $+V_C$. Of course, inasmuch as $-V_E$ is provided, $+V_C$ could be ground voltage.

Thus from an examination of FIG. 4A, an input on the bit lines will be coupled through the interconnections 21 as through the base of the transistors 21A providing a signal on the word line. At the terminal end of each of the word lines 22 are a plurality of transistors designated 23A–23R, to the emitter of each there being connected one word line. Each of the transistors 23A through 23R is base biased by a voltage reference designated $V_{REF}$ on the base of the transistor. The collector of each of the transistors 23A through 23P is connected to the base of an emitter follower or output transistor 24 (24A–24H), the collector of each of the transistors 23 and 24 receiving a voltage from a source of power $+V_C$. As shown, the transistors 23 receive their power through a collector resistor R1, R2, R3, R4, R5, R6 and R7 respectively. The outputs of each of the emitter followers is appropriately designated with the re-expressed form. As illustrated in the upper portion of FIG. 4A, the coupling from both of the bit symbols $d$ and $h$ passes through the encoder directly and provides a direct input to the register (see FIG. 1) to receive the re-expressed form bit symbols.

In order to provide the correct logical relationships in encoding, such as illustrated in the truth tables of FIG. 3, it is necessary that with both an $e$ and an $a$ input, that a phase splitter be provided so as to permit the loading of the appropriate bit lines with an $\bar{e}$ or $e$, $a$ or $\bar{a}$ pulse. Although an inverter might be used for this purpose, a phase splitter such as the phase splitter 25 and 26 is preferably employed so as to maintain proper timing relations between both the $\bar{e}$ and $e$ and $a$ and $\bar{a}$ pulses. Each of the phase splitters is substantially identical and therefore only one will be described. Referring now to FIG. 5, where the phase splitter 26 is illustrated in schematic form, an input transistor 27 is provided with a positive voltage supply $+V_C$ through a resistor R8 to the collector of the transistor 27, the base providing the input $a$. A negative source of power $-V_E$ is applied to the emitter of the transistor through a resistor R9. Inasmuch as the output from the collector of a transistor, when the base is being inputted, is the inverse of the signal placed on the base of the transistor, the output from the collector of the transistor 27 will be the $\bar{a}$ output. By utilizing the emitter of the transistor 27 as a second output and coupling the emitter to the emitter of a second transistor 28, to which the voltage reference $V_{REF}$ has been applied to the base thereof, the output taken from the collector of the transistor will be the same as the $a$ input. Of course, as before, the collector of the transistor 28 is provided with a voltage source through a resistor R10 as by the voltage supply $+V_C$.

As an example of how the array functions, consider the decimal number 73 (heretofore used as an example) in binary-coded-decimal for conversion to its re-expressed form. As set forth above, the number 73 in binary-coded-decimal is 01110011 while the re-expressed form output is 0111011. From the binary-coded-decimal number both $a$ and $e$ are 0 and therefore both the $\bar{e}$ and $\bar{a}$ bit lines will have a positive pulse thereon (hereinafter referred to as being up, while 0 is referred to as being down). With an up signal on both the $\bar{e}$ and $\bar{a}$ bit lines, a positive pulse will be impressed upon the emitter of transistors 23C, 23F, 23G, 23K, 23M, and 23Q. This action of course occurs due to the emitter follower connection between the vertical bit lines and the horizontally extending word lines through the transistors 21A. At the same time note that there is an up signal on $b$, $c$, and $d$ and a down signal on $f$ and an up signal on $g$ and $h$. In a similar manner, an up signal on input $b$ places an up signal on transistor 23B, and 23L; an up signal on $c$ places an up signal on transistor 23D and 23R, while an up signal on $g$ places an up signal on the emitter of transistor 23N. Inasmuch as the input representative of bit symbol $f$ is down (0) transistor 23H has no signal applied to its emitter. From an output consideration of each of the inputs of the binary-coded-decimal number 73, therefore, inasmuch as no signal is applied to the emitter of transistor 23A, the base of output transistor 24A is down and therefore its emitter output is also down. However, with an input on bit line $b$, the emitter of transistor 23B is up causing transistor 23B to cut off and raising the voltage on the base of transistor 24B causing it to conduct. Therefore the output at V is up and the second bit symbol of the seven bit encoder output becomes 1. Since the $\bar{e}$ output is up, the emitter of 23C is up and the base of 24C is then up causing an output at W. This is because there is also an up signal on the emitter of transistor 23D from the up signal on bit line or input *c*. Following through with the remainder of the seven bit encoder output, *d* will be also be up because of its straight through connection. With regard to the output at X, even though the emitter of transistor 23G is up because of the pulse from the $\bar{e}$ line, inasmuch as *f* has been inputted as down or 0, the emitter of transistor 23H is down and therefore no significant potential increase is effected on the base of transistor 24E and the emitter therefore stays down. In a like manner, since transistor 23J has an emitter which is down while the emitter of transistor 23K and 23L is up, no increase is effected on the base of transistor 24F and the output at X therefore is down. In a similar fashion, the emitter of transistor 23M being up as well as the emitter of transistor 23N being up because of an up input at bit line *g*, the base of transistor 24G goes up therefore providing an output of 1 or an up output at Y. In this fashion any two digit binary-coded-decimal number may be traced through.

It should be noted that through the format of encoding heretofore described with regard to a two digit binary-coded-decimal number, the encoding format permits of a parity check with the original binary coded decimal number. That is, the form UVWdXYh form has the same parity as that of the *abcd*, *efgh* form. This parity preservation is not possible in the binary-coded-decimal to true binary conversion scheme. For example, the number 15 in the binary-coded-decimal form is 00010101. As may be seen this number has an odd parity while its seven bit true binary form (0001111) has an even parity. In re-expressed form, digital 15 will be 0001101 which is parity invariant to the binary-coded-decimal form. Accordingly, the encoding scheme of the present invention does not require extra parity handling which makes the re-expression scheme even more valuable and reliable.

DECODING

The decoding scheme and decoding arrays are very similar to the encoding scheme and are treated hereinafter in a more cursory fashion.

To convert from the re-expressed form to a binary-coded-decimal number, the table shown in FIG. 6 may be utilized to convert from the re-expressed form UVWXYdh to the binary-coded-decimal number *abcd,efgh*. The table of FIG. 6 is straightforward and illustrates the conditions under which the outputs from the memory, for example, may be placed into the decoder, in its re-expressed form, to achieve a binary-coded-decimal number output from the decoder. An examination of the upper portion of the chart of table of FIG. 6 shows the relationship between UVWX and Y under various conditions when *e* is equal to 0 or 1 and *a* is equal to 0 or 1. The circles with X therein indicate that it does not matter whether, under that particular condition, that the bit symbol is a 1 or a 0. Additionally, as may be noted, neither *d* nor *h* appear on the charts or table and this is because of the ease in making *d* and *h* a straight throughput from the memory to the binary-coded-decimal output.

Figure 7:
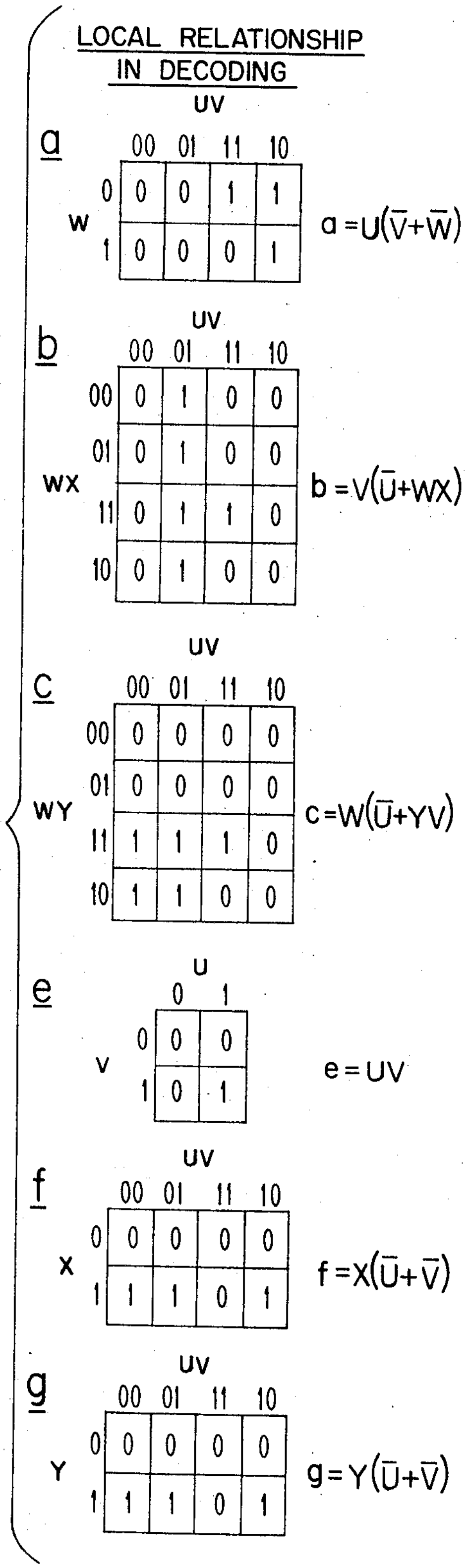
FIG. 7 shows truth tables illustrating the logical relationships utilized in decoding to convert bit symbols from their re-expressed form to binary-coded-decimal numbers.
Figure 8:
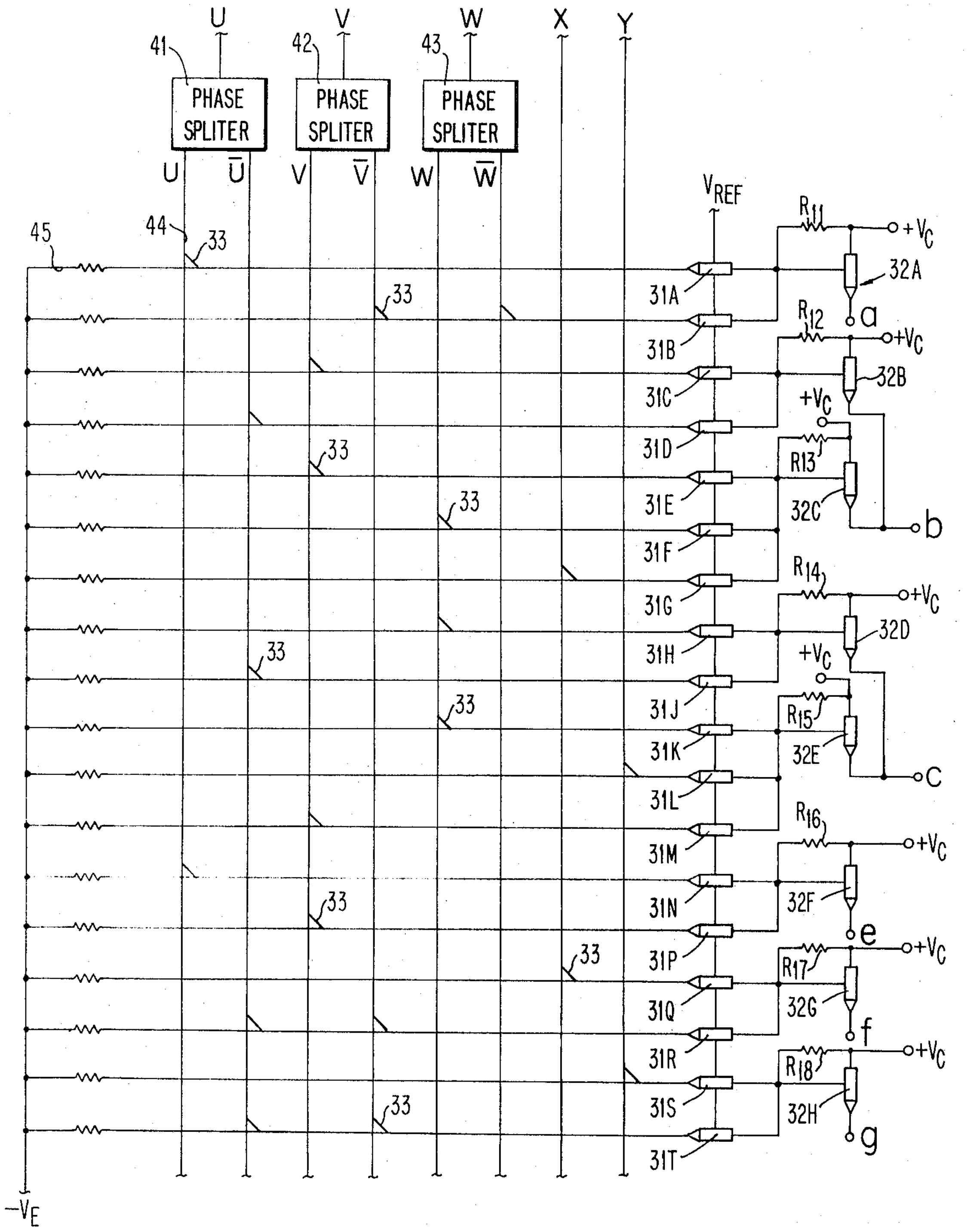
FIG. 8 is a schematic diagram illustrating a re-expression decoding array.

The preferred form of decoder is illustrated in FIG. 8, and is of the same form as the encoder but follows the logical relationships and truth tables illustrated in FIG. 7. It should be noted that the phase splitter shown in boxes 41, 42 and 43 are the same as the circuit illustrated in FIG. 5. Additionally, the same legend material appearing in FIG. 4B also applies to FIG. 8. As shown, the array decoder takes the form of a read only associative memory, re-expression decoding array or array logic and has the advantage of simplicity in timing.

As before, the decoding array has vertically oriented bit lines 44 and horizontally displayed word lines 45, the word lines being biased by the negative power source $-V_E$ and the transistors connected to each of the word lines being coupled thereto as through their emitters. The operation of the decoding array is the same as the operation heretofore described relative to the encoding array, with the exception of the different inputs and different designated outputs, i.e., the inputs are the re-expressed inputs UVWX and Y and the outputs are the *abcefg* or the binary coded decimal numbers.

As shown in FIG. 8 the interconnections between the bit lines 44 and word lines 45 are designated 33, the transistors which are emitter coupled to the word lines and to the bases of which is applied the voltage reference $V_{REF}$ have been designated 31A–31T. The collector load resistors from a positive source of power $+V_C$ have been designated R11 through R18 respectively and the output or emitter follower transistors for outputs *abcefg* have been designated 32A–32H inclusive. To best illustrate the operation of the decoder assume that the original two decimal digit number 78 corresponding to binary-coded-decimal number 01111000 was encoded or compressed to make the re-expressed form 1111110. Thus in the re-expressed form UVWdXY are all 1's and *h* is a 0. Applying these inputs to the inputs to the phase splitters 41, 42, 43 and the inputs on the bit lines 44 illustrates the operation of the encoder as follows: with an up signal on the interconnection 33, the transistor 31A is cut off effecting a raise in the voltage at its collector. However, the application of a $\bar{V}$ and $\bar{W}$ signal to the emitter of transistor 31B permits 31B to continue to conduct preventing the base of output transistor 32A from raising and therefore the output at *a* is a down signal. With an up signal on V transistor 31C is cut off while once again the $\bar{U}$ signal permits transistor 31D to continue to conduct thereby preventing the base of 32B from elevating in potential and thereby maintaining a down output on the emitter of transistor 32B. However, the inputs from V, W and X effect a cut off of transistors 31E, 31F and 31G thereby permitting the potential to raise on the base of transistor 32C causing the emitter of that transistor to raise and thereby causing the output of *b* to be up. In a similar manner, although the up W signal effects cut off of transistor 31H, the $\bar{U}$ signal prevents, by permitting transistor 31J to conduct, the elevating of potential on the base of transistor 32D, therefore providing a down signal at the emitter of that transistor. However, transistor 31K, 31L and 31M are each provided, respectively, with an up signal from inputs W, Y, and V thereby raising the potential on the base of transistor 32E and effecting an elevation of the potential at its emitter causing an up or 1 output at *c*. An up signal is also effected at output "*e*" by the cutting off of transistors 31N and 31P by an up signal appearing at their emitters due to the inputs at U and V. This, of course, raises the potential on the base of transistor 32F and causes the output to be elevated. While transistor 31Q tends to be cut off due to the up input at input X, the not inputs at $\overline{U}$ and $\overline{V}$ tend to permit transistor 31R to conduct preventing the base of transistor 32G from raising in potential and therefore providing a down or 0 output at *f*. In a similar manner, while transistor 31S will attempt to be cut off by the elevation of potential from the input *y*, any tendency for the raising of potential at the base 32H will be counter-effected by the $\overline{U}$ and $\overline{V}$ inputs to transistor 31T which will tend to conduct, therefore providing a down output or 0 output at *g*. Inasmuch as the *d* and *h* inputs and outputs are the same, the output at *d* will be a 1 and the output at *h* will be a 0. Therefore, as may be seen, the input of 1111110 to the decoder illustrated in FIG. 8 provides a binary-coded-decimal output of 01111000, or the decimal number 78.

ALTERNATE ENCODING SCHEME

An even lower loss of information storage capability, as compared with the binary storage capability, may be attained by re-expressing three decimal digits of binary-coded-decimal numbers to a re-expressed form. For example, with three decimal digits of a binary-coded-decimal number, the binary bits may be expressed in the re-expressed form utilizing only ten such bits. Thus when the binary-coded-decimal number takes the form of *abcd, efgh, ijkl* the re-expressed form will be UVWXYZQdhl. The loss of information storage capability by compressing a binary-coded-decimal number of 12 bits to 10 bits, as compared with the binary storage capability is only a loss of 2.4 percent in memory storage capability and therefore may be more attractive to the user. However, the re-expressed form has the disadvantage that it is not parity invariant with the binary-coded-decimal number from whence it was derived.

The table in FIG. 9 illustrates the conversion for a binary-coded-decimal number for re-expression in the form above described, when the binary-coded-decimal number to be encoded is based upon a three digit number. However, it should be understood that it is preferable to use only one system at a time, i.e., a two decimal digit, binary-coded-decimal number conversion system or a three decimal digit binary-coded-decimal number conversion scheme at any one time.

Referring now to FIG. 9, as from the previous analysis, *a* should equal 0 80 percent of the time, *e* should equal 0 80 percent of the time and *i* should equal 0 80 percent of the time and therefore the condition of *a, e* and *i* equalling 0 should be 51.2 percent of the time. In a like manner, when any one of the most significant digits are 1 and the others 0, the occurrence of that condition should be only on the order of 12.8 percent of the time. In a like manner, when two of the most significant digits are equal to 1 with the other being 0, the occurrence of this condition should be only 3.2 percent of the time while with the occurrence of all three significant digits equalling 1 should only occur 0.8 percent of the time. As before, the re-expressed form of a three digit decimal number, in converting a binary-coded-decimal number to the re-expressed form, comprises a class of sets of bit symbols each of the sets corresponding to the respective combination of the bits in the most significant position of each of the four bit groups *abcd, efgh, ijkl* of the respective digits of the binary-coded-decimal number to be encoded. As illustrated in FIG. 9, when *a, e,* and *i* are equal to 0, the set comprises 0; when *a* equals 1 and *e* and *i* are 0 the set is 100; when *e* is equal to 1 and *a* and *i* are 0 the set is 101; and when *i* is 1 and *a* and *e* are 0 the set is 110. In the conditions where *a* and *e* are both 1 and *i* is 0, the set is 11100; and when *a* and *i* are 1 with *e* 0 the set is 11101; when *a* is 0 and *e* and *i* are 1 the set is 11110; and when all three of the most significant digits of the binary-coded-decimal number are 1's, the set is 1111100.

As may be noted in both encoding schemes, i.e., both the two decimal digit or two binary-coded-decimal number scheme and the three decimal digit or three binary-coded-decimal number scheme, when the most significant digit is a 1, the central two digits are always 0's. For example, when *a* is equal to 1, *b* and *c* are always 0, when *e* is equal to 1, *f* and *g* are always 0, and when *i* is equal to 1, *j* and *k* are always 0.

While truth tables and array logic encoding are easily derived utilizing the chart illustrated in FIG. 9, it is believed that inasmuch as such logic is merely an extension of that already described relative to the two digit decimal number (i.e., two digit binary-coded-decimal numbers) that an explanation of such is necessary.

ALTERNATE ENCODER, DECODER EMBODIMENTS

Figure 10:
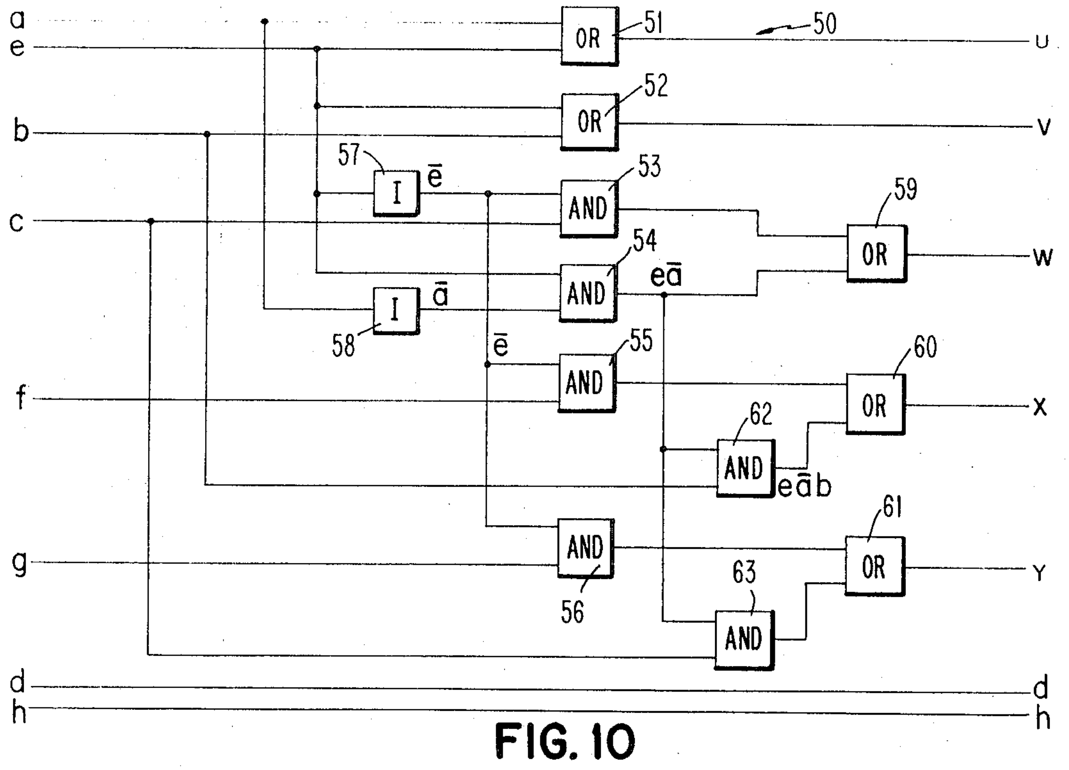
FIG. 10 illustrates another embodiment of an encoding array which may be utilized to convert two digit binary-coded-decimal numbers to a re-expressed form in accordance with the invention.

It should be recognized that other forms of encoders may be utilized in accordance with the invention. For example, and as illustrated in FIG. 10, a random logic approach to encoding may be used. The encoder illustrated in FIG. 10 is a random logic implementation and has or presents certain disadvantages as opposed to the embodiment of the encoder in FIG. 4. For example, there is a timing problem with this type of encoding or decoding (FIG. 10) because of time skew which is evident upon a close examination of the encoder.

Referring now to FIG. 10, the encoder illustrated therein is specifically designed for encoding an eight bit binary-coded-decimal number to a seven bit re-expressed form number such as heretofore described relative to the table in FIG. 2, and the logical relationship truth tables and formulae set forth in FIG. 3. The encoder 50 includes a plurality of input means which correspond to the bit symbols in a binary-coded-decimal number, having the form *abcd,efgh*. The input is shown at the left hand side of FIG. 10. Each of the inputs is coupled to one or more gates, for example OR gates 51, 52 or AND gates 53, 54, 55 and 56. Inverters 57 and 58, as may be seen in FIG. 10, provide respectively the $\bar{e}$ and $\bar{a}$ functions. OR gates 59, 60 and 61 have outputs in the re-expressed form of WX and Y. AND gate 62 which receives its input from the output of AND gate 54 and from input *b* is coupled directly to OR gate 60, while AND 63 which also receives an output from AND gate 54 receives its other input from input *c*, gate 63 being connected directly to OR gate 61.

In order to show the operation of the encoder, to produce an output in re-expressed form from an input comprised of a two digit, binary-coded-decimal number, assume that the binary-coded-decimal number to be encoded is 10010111 which is the decimal number 97. From the table in FIG. 2 we can see that when *a* is equal to 1 and *e* is equal to 0 the set is 10, W corresponding to *c, d* corresponding to *d*, X corresponding to *f*, Y corresponding to *g* and *h*, of course corresponding to $h$. Therefore, the number 97 in re-expressed form is 1001111. Referring now to FIG. 10, the input to $a$ from the binary-coded-decimal number 97 is an up or 1 signal which is applied to the OR gate 51 resulting in an output of 1 corresponding to the U bit symbol. The up input at $a$ is also applied to inverter 58 to make a down output or $\bar{a}$ output from the inverter 58 which is applied to the AND gate 54. Additionally, inasmuch as $e$ is also down, the down or 0 input is applied to gate 52 and applied to inverter 57 providing an up or $\bar{e}$ output. The input to $b$ is 0 or down which is also applied to the OR gate 52 providing a down output or 0 output for the bit symbol V. The down output of $b$ is also applied to the AND gate 62. Input $c$ is also down, and is applied to the AND gate 53 which with the $\bar{e}$ input provides a 0 or down output at the AND gate 53. Inasmuch as both inputs to gate 54 are down, ($e$ and $\bar{a}$), the output from gate 54, $e\,\bar{a}$, applies a down output to the OR gate 59 and therefore the output for bit symbol W is down or 0. The input to $d$, being straight through, equals its output and therefore is a 1 or up. The input to $f$ is up, and inasmuch as AND gate 55 receives a $\bar{e}$ input as well as the up input from $f$, the output from AND gate 55 is up, which when applied to OR gate 60 provides an up output for the bit symbol X. Similarly, an up input is applied at input $g$ which is also applied to AND gate 56 as well as the $\bar{e}$ input. This provides an up output to the OR gate 51 which gives an up output at output Y. Similarly, the input at $h$ corresponds to the output at $h$ and therefore inasmuch as $h$ is up on the input it is also up on the output. Thus the binary-coded-decimal number 10010111 which is the decimal number 97, has in its re-expressed form 1001111.

Figure 11:
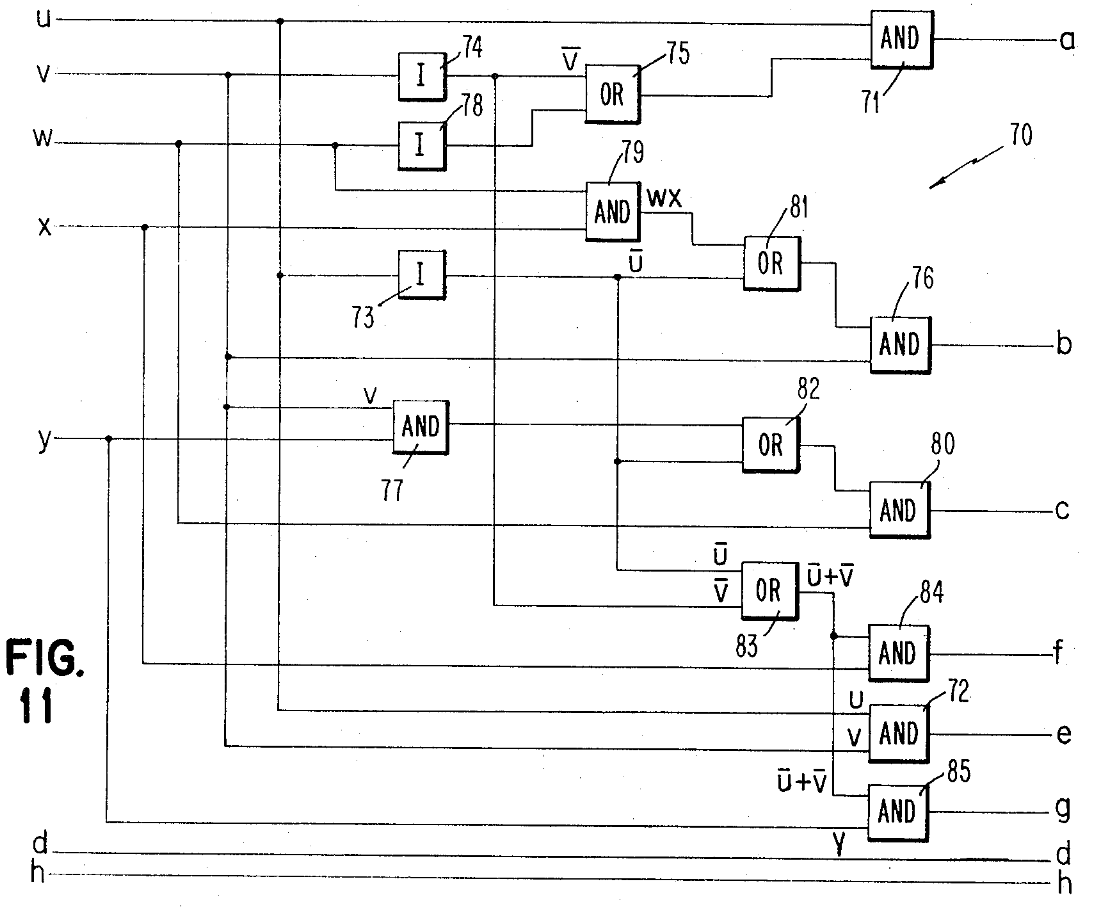
FIG. 11 is another embodiment of a re-expression decoding array which may be utilized in accordance with the present invention.

The decoder illustrated in FIG. 11 is also based on random logic and, with the inputs of a re-expressed form number, provides a binary-coded-decimal number output. For example, assume that it is desired to take the re-expressed form of digital number 97, i.e., 1001111 (see above) and convert it to a binary-coded-decimal number corresponding to the digital number 97. Accordingly, the input U, on the left hand side of FIG. 11, will be up providing an up input to AND gate 71 while applying an up input also to AND gate 72, and an up input to inverter 73. The input at V is down, this input being applied to inverter 74 to provide a $\bar{V}$ output, the $\bar{V}$ output from the inverter 74 being applied to the input of an OR gate 75 giving an up output from the OR gate 75 which is applied to the second input of the AND gate 71. Inasmuch as both inputs of AND gate 71 are up, the output is also up and the first bit symbol $a$ of the binary-coded-decimal number is, therefore, a 1. The down signal applied to V is also applied to AND gate 76, AND gate 77, and AND gate 72. The input on the decoder 70 on input W is down, and therefore the down input is applied to inverter 78 which applies an up input to OR gate 75. The down input is also applied to AND gate 79 and to AND gate 80. The input at X is up, and therefore the input to AND gate 79 is also up. However, since the first input to AND gate 79 from input W is down, the output from AND gate 79 is 0 or down. Additionally, inasmuch as the input at U was up, the output from inverter 73 is $\bar{U}$ and therefore OR gate 81 transmits a down output which is applied to the first input of AND gate 76. Inasmuch as the second input to AND gate 76 is down, from input V being down, the output from AND gate 76 at V is down. The input at Y is up, and therefore the AND gate 77 receives an up signal on the second input, but receives a down signal on the first input from input V. Accordingly, there is a down output from AND gate 77 which is applied to the first input of OR gate 82. The second input to this OR gate is the $\bar{U}$ signal which is also down and therefore the output from OR gate 82 is down which is applied to the first input of AND gate 80. Thus even though the second input to AND gate 80 or W is down, the output at $c$ from AND gate 80 is down. To determine the output at $f$, the inverter 74 applies a second output of $\bar{V}$ (and therefore an up signal) to the second input of OR gate 83 therefore providing an up output from OR gate 83. Additionally, a $\bar{U}$ signal is also applied to the first input of OR gate 83, and inasmuch as $\bar{U}$ is a down signal, the output of the OR gate 83 is also up. This up output is applied to the first input of AND gate 84, and inasmuch as the second input is the up signal provided by the input at X, the output at $f$ is up. The AND gate 72 receives its first signal from its first input from the up signal U and its second input from the down signal V and therefore, inasmuch as the inputs are not the same, the output from the AND gate is down at output $e$. Additionally, the up signal from OR gate 83 is applied as a first input to AND gate 85, and the second input is applied by the up signal at input Y, giving an up output at $g$ from the AND gate 85. As before, inasmuch as the least significant bit outputs are the same as the inputs, both $d$ and $h$ are 1's or up signals. Thus the binary-coded-decimal number 10010111 (decimal number 97) is produced by an input of 1001111.

Thus the present invention provides apparatus for encoding multi-digit binary-coded-decimal numbers where each of the binary-coded-decimal numbers has a predetermined first quantity of bits, and encoding these numbers into encoded numbers having a second quantity of bits less than the predetermined quantity.

Although the invention has been described with a certain degree of particularity, it is understood that the present disclosure has been made only by way of example and that numerous changes in the method of construction and the method of combining parts may be made without departing from the spirit and the scope of the invention as hereinafter claimed.

What is claimed is:

1. Apparatus for encoding multidigit binary-coded-decimal numbers, each of a predetermined first quantity of bits, into encoded numbers each having a second quantity of bits less than said predetermined quantity, said apparatus comprising: means for selecting a set from a class of sets of bit symbols with each set corresponding to a respective combination of the bits in the most significant position of each of the four-bit groups representing the respective digits of the binary-coded-decimal number to be encoded; said selected set being the set corresponding to said respective combination and determining certain of the bits of the multi-digit binary-coded-decimal number to be encoded and leaving undetermined the other bits of said multi-digit binary-coded-decimal number to be encoded; register means having a plurality of bit positions equal to said second quantity, means for transmitting said bit symbols of said selected set to respective predetermined positions in said register means, and means for transmitting said undetermined other bits of said multi-digit binary-coded-decimal number to other respective predetermined positions in said register means, whereby said register means will store an encoded number representing and having fewer bits than said multi-digit binary-coded-decimal number.

2. Apparatus in accordance with claim 1 including memory means for storing said second quantity of bits less than said predetermined quantity.

3. Apparatus in accordance with claim 2 including second register means connected to said memory means for receiving said second quantity of bits less than said predetermined quantity from said memory means, and means for decoding said second quantity of bits to provide a binary-coded-decimal number output corresponding to said encoded number.

4. Apparatus for compressing binary-coded-decimal numbers of at least two decimal digits, into a re-expressed lower number of bits, said binary-coded-decimal number being expressed in the form *abcd,efgh*, said apparatus comprising: encoding means for selecting a set from a class of sets of bit symbols representative of the state of the bits *a* and *e*, and encoding at least the bit symbols *b*, *c* and *f*, *g* in accordance with said sets selected; register means having a plurality of bit positions equal to said lower number of bits, and means to transmit said selected set of bit symbols to said register means from said encoding means and said encoded bit symbols *b*, *c* and *f*, *g*; and means to transmit to said register means, said binary-coded-decimal bits *d* and *h*.

5. Apparatus for compressing binary-coded-decimal numbers in accordance with claim 4 wherein said encoding means comprises an array logic encoder comprised of current switch emitter follower circuits.

6. Apparatus for compressing binary-coded-decimal numbers in accordance with claim 4 wherein said encoding means comprises a random logic circuit.

7. Apparatus for compressing binary-coded-decimal numbers in accordance with claim 4 wherein said re-expressed lower number of bits takes the form of UVWdXYh, and wherein said re-expressed bit symbols *d* and *h* are the same as the bit symbols *d* and *h* in the binary-coded-decimal number.

8. Apparatus for compressing binary-coded-decimal numbers in accordance with claim 4 wherein said re-expressed lower number of bits takes the form of UVWdXYh, and including logic means in said encoder for determining the bit symbol U by ORing *e* and *a*.

9. Apparatus for compressing binary-coded-decimal numbers in accordance with claim 8 including further logic means in said encoder for determining said bit symbol V by ORing *e* and *b*.

10. Apparatus for compressing binary-coded-decimal numbers in accordance with claim 4 wherein said encoding means includes random logic circuits in the form of a read-only memory.

11. Apparatus for compressing binary-coded-decimal numbers in accordance with claim 4 wherein said encoding means comprises an array logic encoder including current switch emitter follower circuits.

12. Apparatus for compressing binary-coded-decimal numbers of at least three decimal digits, into a re-expressed lower number of bits, said binary-coded-decimal number being in the form *abcd*, *efgh*, *ijkl*, said apparatus comprising: encoding means for selecting a set from a class of sets of bit symbols representative of the state of the bits *a*, *e*, and *i* an encoding at least the bit symbols *bc*, *fg*, and *jk* in accordance with said sets selected; register means having a plurality of bit positions equal to said lower number of bits, and means to transmit said selected set of bit symbols to said register means from said encoding means and said encoded bit symbols *b*, *c*, *f*, *g*, *j*, *k*; and means to transmit to said register means, said binary-coded-decimal bits *d*, *h*, and *l*.

13. Apparatus for compressing binary-coded-decimal numbers of at least two decimal digits into a re-expressed lower number of bit symbols, said apparatus comprising: encoding means for selecting a set of bit symbols from a class of sets of bit symbols, each set corresponding to the state of the most significant bit position of the binary-coded-decimal number to be encoded and for determining certain of the bits of the multi-digit, binary-coded-decimal number to be encoded; register means having a plurality of bit positions equal to said re-expressed lower number of bit symbols, means connecting said register means to said encoding means for receiving bit symbols of said selected set of bit symbols and storing the same in a predetermined position therein; and for receiving bit symbols from said binary-coded-decimal number which are less significant than the most significant bit in other predetermined positions in said register means.

14. Apparatus in accordance with claim 13 including means for decoding said second quantity of bits to provide a binary-coded-decimal number output corresponding to said encoded number.

* * * * *